United States Patent

Frischknecht et al.

[11] Patent Number: 5,533,371
[45] Date of Patent: Jul. 9, 1996

[54] MEASUREMENT DEVICE FOR ROLL GAP CONTROL AND PROCESS FOR ITS OPERATION

[75] Inventors: Bruno Frischknecht, Gwatt; Peter Messerli, Heinberg; Daniel Fankhauser; Rudolf Roder, both of Thun; Rolf Eigel, Schwanden, all of Switzerland

[73] Assignee: Lauener Engineering, Ltd., Gwatt, Switzerland

[21] Appl. No.: 949,521

[22] PCT Filed: Jan. 24, 1992

[86] PCT No.: PCT/CH92/00015

§ 371 Date: Aug. 16, 1993

§ 102(e) Date: Aug. 16, 1993

[87] PCT Pub. No.: WO92/13652

PCT Pub. Date: Aug. 20, 1992

(Under 37 CFR 1.47)

[30] Foreign Application Priority Data

Feb. 1, 1991 [CH] Switzerland ............ 00315/91

[51] Int. Cl.⁶ .................................. B21B 37/08
[52] U.S. Cl. ................ 72/21.1; 72/10.7; 33/657
[58] Field of Search ................. 72/16, 21, 35; 33/657, 710, 711

[56] References Cited

U.S. PATENT DOCUMENTS

| | | | |
|---|---|---|---|
| 3,570,288 | 3/1971 | Fischer et al. | 72/21 |
| 3,817,068 | 6/1974 | Meyer | 72/35 |
| 3,902,114 | 8/1975 | Alich | 72/21 |
| 4,059,794 | 11/1977 | Furness et al. | 72/21 |

FOREIGN PATENT DOCUMENTS

| | | | |
|---|---|---|---|
| 2503130 | 7/1976 | Germany . | |
| 47-32908 | 8/1972 | Japan . | |
| 0209710 | 12/1982 | Japan | 72/21 |
| 59-191555 | 10/1984 | Japan . | |
| 62-214812 | 9/1987 | Japan . | |
| 0224811 | 9/1988 | Japan | 72/21 |
| WO90/15679 | 12/1990 | WIPO | 72/35 |

*Primary Examiner*—Lowell A. Larson
*Assistant Examiner*—Thomas C. Schoeffler
*Attorney, Agent, or Firm*—Bachman & LaPointe

[57] ABSTRACT

A rolling or continuous casting and rolling mill facility includes a roll set comprising working rolls defining a roll gap therebetween and support rolls, at least one of the working rolls and the support rolls having coaxial reduced diameter barrel portions defining measurement surfaces thereon; a measuring element for determining the roll gap by measuring a distance between the measurement surfaces, comprising a measurement head and a contact-free double sensor positioned on the measurement head; and an element for moving the measurement head between a working position wherein the double sensor is positioned in a rolling plane drawn through axes of rotation of the working rolls and aligned with the measurement surfaces and a rest position wherein the measurement head and double sensor are withdrawn from the rolling plane.

17 Claims, 4 Drawing Sheets

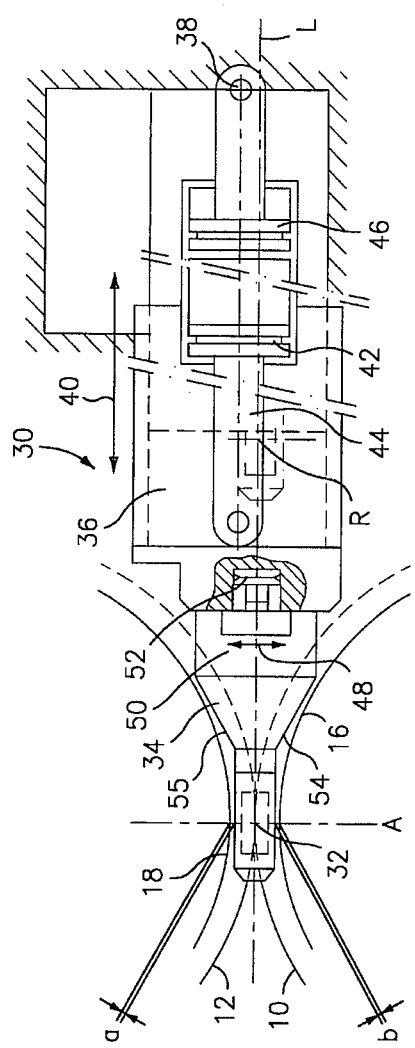
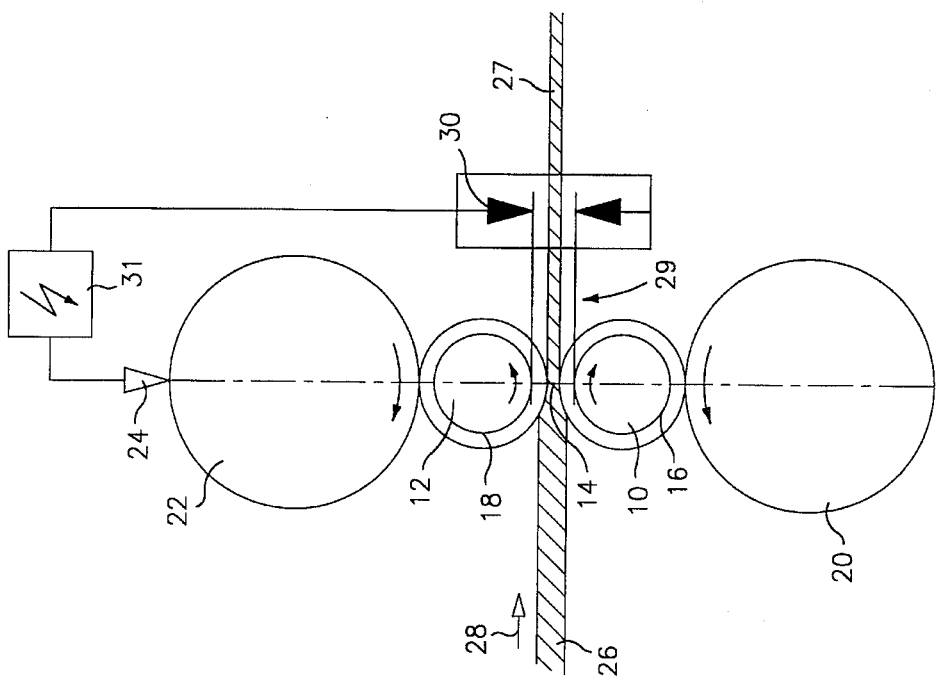
FIG. 2
FIG. 1
(PRIOR ART)

5,533,371

MEASUREMENT DEVICE FOR ROLL GAP CONTROL AND PROCESS FOR ITS OPERATION

BACKGROUND OF THE INVENTION

The invention relates to a measurement device for control of the roll gap between the working rolls of a rolling or continuous casting and rolling mill, wherein the measurement device emits signals for process monitoring and control via at least one contact-free fitted sensor. The invention also relates to a process for the operation of a measurement device and its centering.

Measurement devices of the above type work under difficult conditions; the most common influences which can have damaging effects either alone or in combination are:

very coarse operation high throughput of coolant such as for example kerosene, liquid paraffins, water emulsions high ambient temperatures, up to around 80° C. in cold rolling mills, up to around 200° C. in hot rolling mills, even higher in continuous casting and rolling mills explosive media environment.

Hot rolling mills used as billet rolling mills produce strip thicknesses in the range from 4 to 60 mm, hot casting mills from 4 to 30 mm and cold rolling mills from virtually 0 to around 10 mm. Obviously these size ranges are given solely as examples.

The wearing working rolls are periodically reground by around 0.02 to 0.1 mm until their barrel diameter is only around 90% of the original diameter.

The strip thickness is affected in the fine range by the changes in rolling force, for example as a result of fluctuations in the hardness of the metal, incoming tolerance errors in the strip, fluctuations in the front tension forces, roll eccentricity and/or temperature changes.

In cold rolling mills in particular, the strip thickness tolerances are very tight. For example with a 0.2 mm thick strip, a tolerance of ±1.6 µm is required. This necessitates a positioning accuracy of the working rolls of at least ±1 µm.

Numerous measurement devices for controlling the roll gap are known.

CH,A 649012 describes a measurement device attached to a fixed part via a support. Attached to each of two lifting rods is a jaw, where one end of these jaws lies by spring pressure against the face of the reduced barrel diameter. A change in the roll gap is transferred to a measurement device via a pretensioned steel wire. Using this measurement device, the roll gap can be determined both analog and digitally.

DE,A 3512290 describes a measurement device which is arranged between two working rolls to be measured. In the area of both faces of the working rolls are arranged four supporting rolls in a star pattern. They lie against the barrel surfaces and are mounted to swivel on bearings on a measurement body. For mutual synchronization of the supporting rolls, these are connected mechanically to a toothed gear. The mechanical movement is converted into an electrical signal via a measurement sensor fitted in the measurement head.

U.S. Pat. No. 4,063,363 finally describes a measurement device which is screwed to a lower chock. A rod serves to guide two jaws which are pressed against the reduced diameter measurement surfaces by means of a spring. A linear emitter is arranged parallel to the roll gap adjustment, where this emitter measures the adjustment of the two resting jaws in direct relation to each other. The measurement device fitted at the face at both ends must be removed when the roll is changed.

The measurement device for a roll gap described in JP,A 62-214812 comprises two eddy current sensors 19, 20 which are mounted on a scissor-like spreadable carrier device. The roll gap is measured not in the area of the shortest spacing, on the roll plane, but indirectly using side auxiliary parameters.

DE,A 2503130 refers to an inductive, capacitive or laser-type measurement emitter which is arranged between two rolls and spring-mounted on a roller via an emitter holder. A sliding surface is formed on a roll pin so the measurement device does not work contact-free.

None of the known measurement devices for continuous monitoring of the roll gap during operation can satisfy all requirements of a modern rolling mill with regard to accuracy, function suitability, long life, simple mounting and economic operation.

The task facing the inventors was to create a contact-free measurement device of the type described above, which fulfils all the above requirements in a running rolling mill, measures the spacing between the working rolls in a simpler, more reliable and favorable cost manner and passes corrections to the adjustment element controls for adjustment of the roll gap. A process for operation and centering of such a measurement device should also be created.

SUMMARY OF THE INVENTION

With regard to the measurement device, the task is solved by the invention in that a roll set has on the working and/or supporting rolls at the front ,end coaxial measurement surfaces on reduced barrel diameters, in the area of the rolling plane between the reduced barrel diameters of the working rolls is arranged a measurement head with a double sensor or between the reduced barrel diameters of the supporting rolls and/or the working rolls is arranged in each case one sensor aligned to at least one measurement surface and carried by a measurement bracket, where the measurement head or bracket can be removed and/or demounted during operation. Special and further design forms of the measurement device according to the invention are the object of the relevant patent claims.

The term roll set refers to a unit formed from working rolls, supporting rolls and bearing housings, the latter also being known as chocks. Neither a measurement head nor a measurement bracket is fitted to the roll set, which allows demounting without interrupting operation.

The invention relates exclusively to an operating process of an in-line working measurement device. A static adjustment and measurement device as is known from JP,A 59-191555 for example cannot be used during operation as the space between the guide and deflector rolls is filled by the steel bar. Before casting begins, the rolls are pushed apart, a double sensor lowered and the roll gap statically measured, wherein numerous measurements must be carried out for a roll pair at different heights and the lowest spacing determined by calculation.

The working area of a sensor according to the invention however lies in the area of the rolling plane, which term refers to the plane formed by the roll axes. It is important that a sensor surface functioning during operation never touches a measurement surface of a working or supporting roll. The sensors are preferably designed as eddy current probes, and for continuous casting and rolling mills also laser probes, capacitive probes or ultrasound probes, can be used.

The following spacings can be used for roll gap control, where the designer must design the face area of the roll set accordingly:

a) Reduced barrel diameter of the working rolls, with double sensor arranged between the measurement surfaces b) Reduced barrel diameter of the working rolls, with sensors supported on a measurement bracket and arranged between a measurement surface and a supporting roll c) Reduced barrel diameter of the supporting rolls, with sensors supported on a measurement bracket and arranged between a measurement surface and a working roll d) Reduced barrel diameter of the working and supporting rolls, with double sensors supported on a measurement bracket and arranged between the measurement surfaces. Thus the roll gap can be measured via the measurement surfaces of the working and/or supporting rolls.

With a measurement from supporting roller to supporting roller (variants c and d), the roll end formation is excluded.

In all variants, the arrangement of the sensors in the area of the rolling plane is of essential significance to the invention. All rolls have play even if only slight, e.g. 0.1 mm. During operation, the play is suppressed in the direction of the rolling plane, but not vertically to it. Only for measurements outside the rolling plane does this unsuppressed play have an effect, e.g. on measurements according to JP,A 62-214812 mentioned above.

The measurement surfaces of the working rolls with reduced barrel diameter never come into contact with the material to be processed during rolling or continuous casting and rolling, so are not worn away. When the barrel surfaces are reground, it must only be ensured that the measurement surfaces remain coaxial.

The spacing between measurement surfaces formed from working rolls lying on top of each other, i.e. a roll gap equal to zero, is created according to variant a) from the sum of the spacings of the upper sensor from the upper measurement surfaces, the lower sensor from the lower measurement surfaces and the unchanged spacing of the two sensor surfaces. Clearly it is not important to the measurement result that the double sensor is positioned exactly in the center between the measurement surfaces. The double sensor is, however, preferably centered in order to avoid contact or near contact with one measurement surface and leave a certain amount of play.

In variants b) to d), the measurement bracket is the constant spacing, as in a) only spacing changes are important, not absolute spacings.

The actual commercially available sensors or double sensors must fulfil the following requirements in particular:

reproducible measurement precision of around 1 µm resistance to the working atmosphere, in particular thermal and chemical resistance accurate linear measurement over all distances no sensitivity to roll oil and dirt.

A high precision measurement is guaranteed only if both sensors of the measurement device are arranged in the area of the rolling plane such that, as explained above, the play of the rolls has no effect.

In the following, for the sake of simplicity only the variant referred to above as a) is described in detail, the description applies accordingly to variants b) to d).

On the faces of the working rolls with reduced barrel diameter at least one non-magnetized measurement ring can be fitted in each case, where the measurement ring or the outer measurement ring in a radial direction forms the measurement surface coaxial to the roll barrel.

The preferred arrangement of measurement rings depends on the measurement probe type, the use of roll oils and any risk of contamination. For example in continuous casting and rolling mills, if laser probes are used, no measurement rings are required as metal surfaces can be measured with good reproducibility, high precision and linearity. Laser probes cannot however be used if roll oils are used and/or there is a risk of contamination. Capacitive probes are also only suitable for continuous casting and rolling mills.

Eddy current probes however are not able to measure the spacing between metallic surfaces with the necessary linearity. With the use of eddy current sensors, which have the great advantage of not reacting either to roll oils or contamination, non-magnetic measurement surfaces are required. The use of non-magnetic measurement rings is therefore essential with eddy current probes.

In practice pre-produced measurement rings of stainless steel, which have been shrunk on and ground in, have proved particularly successful. Non-magnetic measurement surfaces, in particular of stainless steel, can however also be fitted by means of known physical or chemical deposit processes and if necessary ground in. For the sake of simplicity, such layers are also called measurement rings.

The measurement head or measurement bracket of a measurement ring has an activator mechanism which is not attached to the roll set and which can be removed and/or demounted.

The design of a preferably fitted activator mechanism for an adjustable, reproducible positioning of the sensors in the gap between the measurement surfaces is restricted by the reduced space in a rolling or continuous casting and rolling mill. A preferred design is a height-adjustable horizontal, extension arm which can also swivel.

The measurement head or measurement bracket can have centering chamfers, suitably symmetrical, in the direction of the roll gap for setting to the measurement surfaces. Depending on the design, the chamfers can be wedge-shaped or truncated cone-shaped.

With regard to the process according to the invention for operating the measurement device, for continuous compensation of any eccentricity of the working rolls for rolling or continuous casting and rolling, the total of the two spacings of the measurement surfaces from the relevant sensor surfaces is measured constantly and compared with a nominal value by a process computer, any deviation from the nominal value by more than a specified value triggers actuators for adjustment of the roller spacing. The actuators act for example on adjustment elements, valves etc.

The continuous compensation for eccentricity is extremely important for the evenness of the strip in rolling or continuous casting and rolling. Depending on the precision required, compensation takes place for example on deviations of 1–100 µm from the nominal value. With current technology, compensation can be made up to 10 revolutions of the working rolls per second.

With reference to the process for centering a measurement device which has a retractable measurement head or measurement bracket with chamfers, the task is solved according to the invention in that the measurement head or measurement bracket guided on the extension arm and moving vertically is aligned firmly by pressing the chamfers on the measurement surfaces of the working rolls with reduced barrel diameter or the corresponding barrel surfaces, fixed in this centering position and the extension arm returned to the rest position. Special and further design forms of the process are the object of the relevant patent claims.

This centering process need only be repeated when changing a roll or similar. Using an extension arm swivelling in or parallel to the tangential plane in the roll gap, the centering process takes place after the arm has swivelled.

The centering preferably takes place when the rolling mill is adjusted before rolling commences. For this the working rolls are moved together and with a roll gap of 0 mm slowly turned with a defined setting force while the measurement head or measurement bracket is adjusted. The setting force is for example 10 to 50%, in particular around 30% of the maximum permitted rolling force, and the working rolls turn with a peripheral speed of 5 to 30 m/min.

The preferably applied process of centering with defined setting force has the advantage that the measurement device is set to the loaded pass line. The pass line is the horizontal line which runs between the working rolls at a roll gap of 0 mm. Because of the elastic elongation of the roll housing under load, the loaded and unloaded pass lines may be offset by an order of magnitude of 1 to 2 mm.

The measurement device according to the invention, the process for operation and the process for centering are universally applicable irrespective of the design principle of the rolling and continuous casting and rolling mills. Rolling mill stands for metals, also known as housings, with hydraulic setting cylinders are however preferred.

The sensors, including double sensors, are selected according to the requirements and the use of auxiliary agents such as roll oils or similar from the range available commercially or produced specially for the relevant application. Eddy current sensors are preferred as they do not react to roll oils or contamination. For continuous casting and rolling mills in particular however ultrasound, laser or capacitive probes can also be used.

BRIEF DESCRIPTION OF THE DRAWINGS

The invention is described in more detail using the design examples shown in the drawing which are also the object of the relevant patent claims. The diagrams show:

FIG. 1 a four-high stand for cold-rolling of strips, with a known measurement device, FIG. 2 a measurement device for direct adjustment of the roll gap on the working rolls, FIG. 3 a perspective view of a double sensor, FIG. 4 the face end of a working or supporting roll with reduced barrel diameter, FIG. 5 a variant of a measurement device, FIG. 6 a further variant of a measurement device, FIG. 7 a four-high stand with a measurement bracket for adjustment of the roll gap on the supporting rolls, and FIG. 8 a hydraulic roll gap adjustment system.

DETAILED DESCRIPTION OF THE PREFERRED EMBODIMENTS

Figure 5:
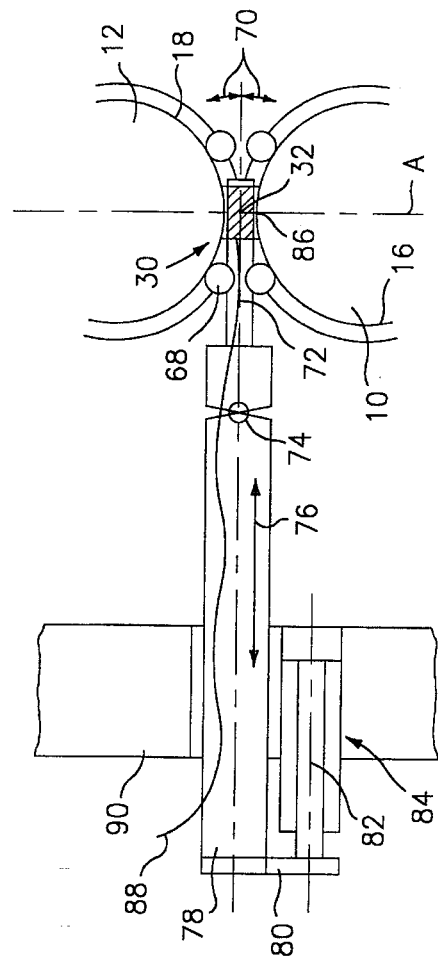

FIG. 1 shows the essential functional parts of a four-high stand for cold rolling of strips, where the stands and bearing housings have been omitted for the sake of clarity. The lower and upper working rolls 10, 12 define a roll gap 14. These working rolls have a reduced barrel diameter at both ends which form the measurement surfaces 16, 18 coaxial to the roll barrels. One lower and one upper supporting roll 20, 22 transfer the roll force from the setting cylinders 24, for the sake of clarity only the upper is shown, to the corresponding working rolls 10, 12. Evidently with a corresponding design of the rolling mill, instead of upper and lower, right and left working and supporting rolls can be used.

An incoming metal strip 26 is drawn in the direction of the arrow 28 between the two working rolls 10, 12 and cold rolled to a thin metal strip 27.

To control the strip thickness, it is necessary to be able to monitor the roll gap 14 i.e. the spacing between the working rolls 10, 12 using a measurement device 30. According to FIG. 1, in accordance with the known state of the art, two levers are shown lying on measurement surfaces 16, 18 and forming so-called measurement pincers 29. Using an inductive probe for example, the movements of the measurement pincers 29 are detected and transferred to a command emitter 31 which triggers the adjustment of the rolling force and hence of the roll gap 14.

The cold rolling mill shown in principle in FIG. 1 corresponds, apart from the design of the measurement device, to a design form of the present invention. Hot rolling mills and continuous casting and rolling mills are designed similarly in the known manner.

FIG. 2 shows a measurement device in accordance with the invention in working position A. The dotted line marked A also represents the rolling plane and hence the connecting line between the axes of the working rolls 10, 12. The two working rolls 10, 12 lie practically against each other, the roll gap 14 (FIG. 1) is very small or practically equal to 0. The measurement surfaces 16, 18 form an intermediate space in which is fitted a double sensor 32 of the measurement device 30. This double sensor 32 is centered i.e. it is exactly equally distant from the lower measurement surface 16 and the upper measurement surface 18. To determine the roll gap between working rolls 10, 12, the sum is calculated of the lower and upper spacings of double sensor 32 running in direction A from the relevant measurement surfaces 16, 18 and the linear extension of double sensor 32 in the same direction. With working rolls 10, 12 lying against each other, the measurement value of zero applies to the roll gap. The difference between the measured value and this value corresponds to the roll gap.

The double sensor 32 is attached to a measurement head 34 which in turn lies on a horizontally arranged extension arm 36. This extension arm 36 swivels about a rotation axis 38 and can be extended in the direction of arrow 40. The double sensor 32 has spacing a from the upper measurement surface 18 and spacing b from the lower measurement surface 16.

The extension arm 36 is extended in two stages via an extension cylinder 42 with cylinder rod 44 and a centering cylinder 46. The extension arm 36 can for example move over a play-free horizontal table.

The measurement head can move in a vertical direction indicated by an arrow 48 over a play-free vertical table 50 and can be fixed with a clamping cylinder 52.

R refers to the rest or retracted position of the double sensor 32, shown in dotted lines. Extension cylinder 42 is used to effect the change from the working position A to the retracted position R and vice versa.

The measurement device 30 is centered as follows. The working rolls 10, 12 are moved together and slowly turned with a defined setting force with a roll gap 14 (FIG. 1) of 0 mm. The extension arm 36 is extended, driven by extension cylinder 42. The measurement head 34 with double sensor 32, which is supported on bearings to move vertically on extension arm 36, is moved between the measurement surfaces 16, 18. The measurement head 34 now lies, because of its weight, on the lower measurement surface 16. The centering cylinder 46 now moves the entire extending arm 36 further forward. The measurement head 34 is lifted, guided by the lower chamfered surface 54 lying on the lower measurement surface 16, in the direction of arrow 48 until the upper chamfered surface 55 touches the upper measurement surface 18. The measurement head 34 is thus firmly aligned and centered The clamping cylinder 52 is activated and the measurement head is fixed in this position. The centering cylinder is then retracted, the measurement head 34 now no longer touches measurement surfaces 16, 18 and lies precisely in the pass line L.

When this centering process is concluded, the two positions working position A and rest position R can be taken up by activation of the extension cylinder 42.

Figure 3:
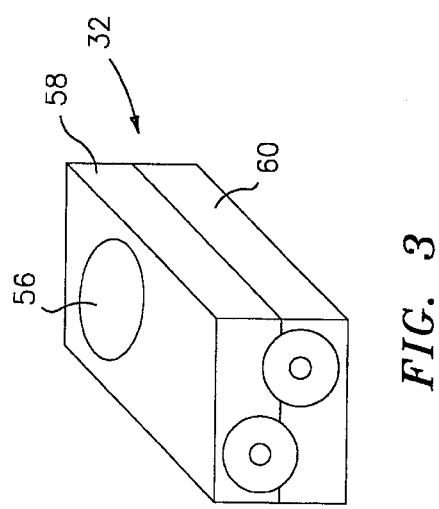

With the double sensor 32 drawn in perspective in FIG. 3, the upper sensor surface 56 which is flush with the upper housing half 58 is visible. The sensor surface allocated to the lower housing half 60 is not visible.

To protect the sensor surface 56 projecting plastic strips or plates, not shown, can be used.

Figure 4:
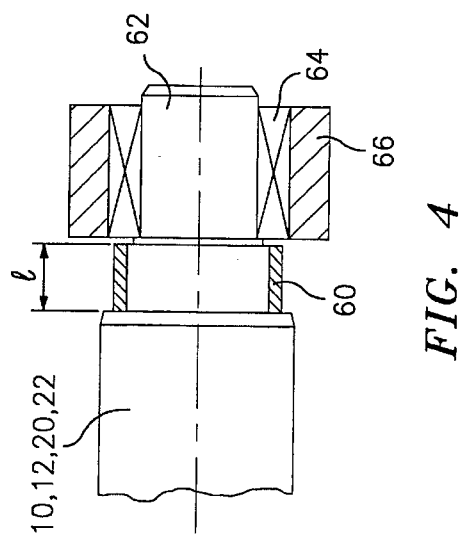

The face ends of a working roll 10, 12 or a supporting roll 20, 22, one of which is shown in FIG. 4, are turned in over a length 1 of around 80 mm, where in the present case the barrel diameter is reduced by around 8 cm. A measurement ring 60 of non-magnetic stainless steel, for example V 2 A, is shrunk onto this and the roll barrel and measurement ring 60 overground in the same chuck so that their surfaces are exactly coaxial.

The roll pin 62 is mounted on a roller bearing 64 in the chock 66, also known as a bearing housing.

In accordance with the variant in FIG. 5, a double sensor 32, in this case an eddy current sensor, measures at the same time upward and downward the distance to the measurement surfaces 16, 18. The double sensor 32 works without contact and is not sensitive to roll oil or any dirt particles.

As the double sensor 32 would react differently to measurement surfaces 16, 18 of magnetic material, the turned face ends of working rolls 10, 12 are fitted with at least one shrunk-on measurement ring 60 (to FIG. 4), not shown, of stainless steel.

The double sensor 32 is held exactly in the center of the axis of the working rolls 10, 12 during operation by means of pincers 68 lying on the measurement surfaces 16, 18 via rollers. The four end rollers of pincers 68 are pressed lightly against the measurement surfaces 16, 18 of the working rolls 10, 12 by means of a pneumatic or hydraulic cylinder not shown. As the running points lie outside the measurement range, they do not affect the measurement results due to general long-term wear.

To retract and extend the measurement unit 30, the pincers 68 are fully foldable as shown by arrow 70.

The pincers 68 are connected via a swivelling leg 72 to a joint 74 which lies against a supporting protective housing 78 which can move horizontally in the direction of arrow 76. This protective housing 78 consists in the present case of a welded steel construction and is rigidly connected via a vertical support 80 to the cylinder rod 82 of a horizontal hydraulic cylinder 84. The hydraulic cylinder 84 serves to position and retract and extend the pincers 68.

The area of the measurement surfaces 16, 18 under the impact of the eddy current from the double sensor 32 are marked 86. The measurement areas have for example an area of 4×2 mm. The signals generated are passed to a process computer or actuator, not shown, via a signal cable 88 firmly installed on the double sensor 32, where the signal cable 88 passes through the opening in support 90 provided for the protective housing 78 and the horizontal hydraulic cylinder 84.

Figure 6:
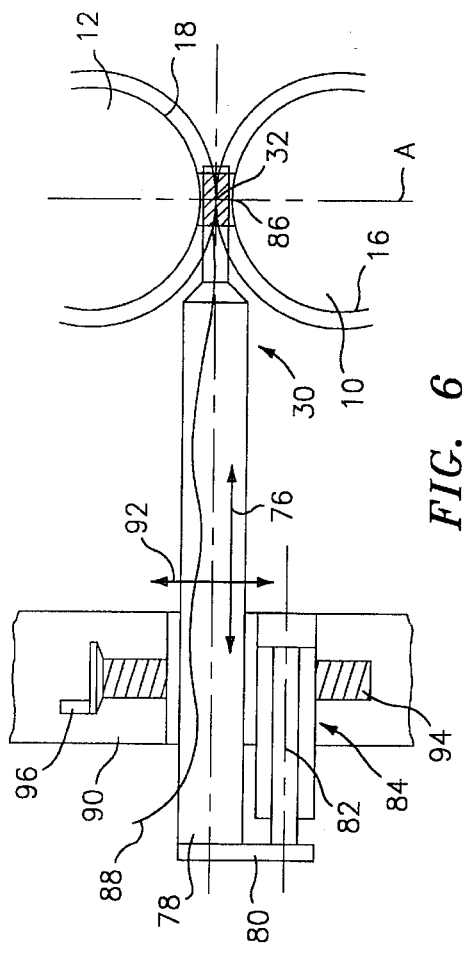

The design form in FIG. 6 differs from that in FIG. 5 essentially in that the double sensor 32 is centered not with articulated guided pincers but with a protective housing 78 which moves not only horizontally in the direction of arrow 76 but also vertically in the direction of arrow 92. The double sensor 32 designed as an eddy current sensor again measures simultaneously upward and downward the distance to the measurement areas 16, 18. The vertical centering is not very important as the two measurement values are totalled when determined electronically upward and downward simultaneously.

Figure 7:
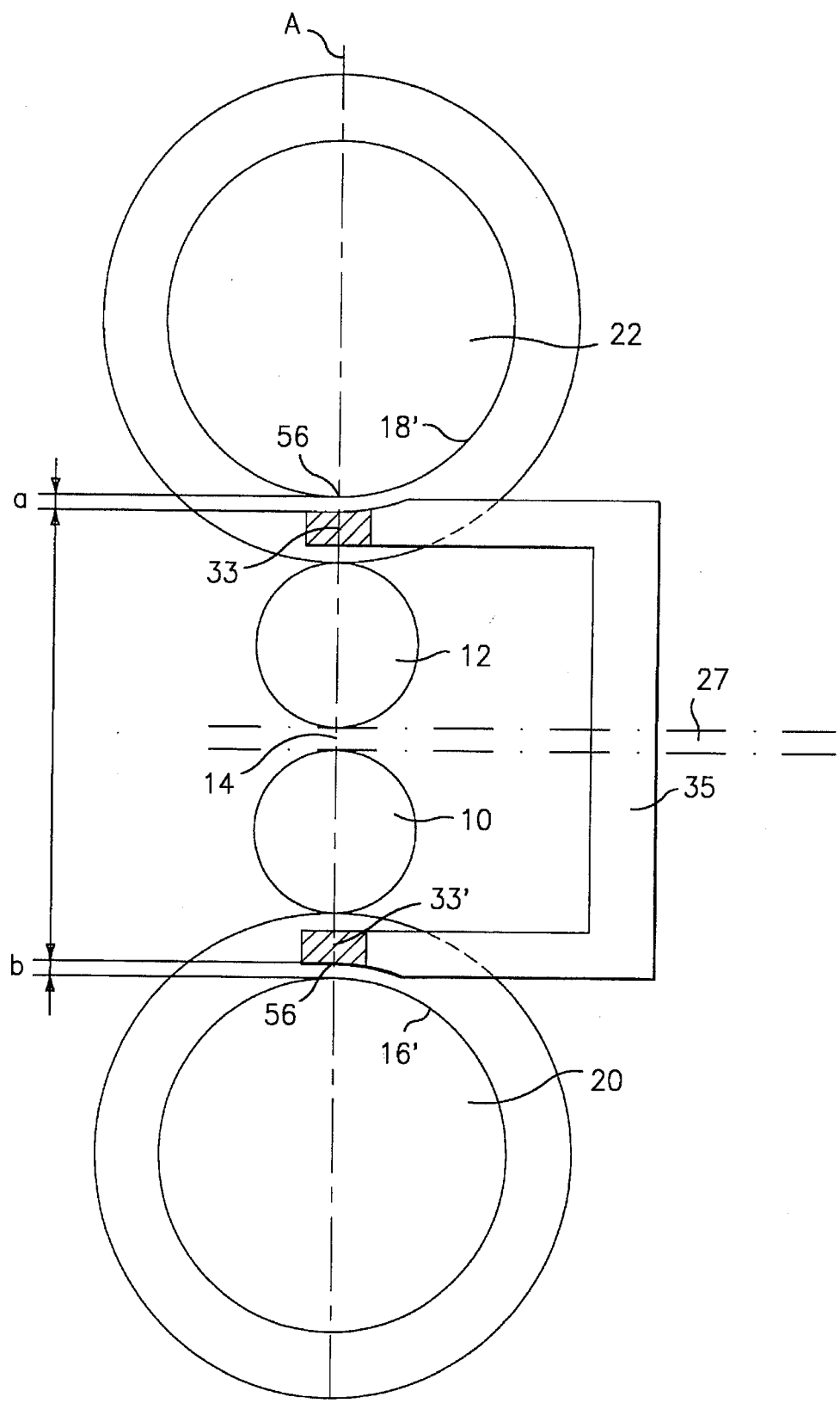

The double sensor 32 is aligned in the measurement gap using a lifting spindle 94 which is activated by motor or a handle 96 as shown. To change the roll, the protective housing 76, also known as an extension arm, can be retracted with the hydraulic cylinder 84. A signal cable 88 is again firmly installed with the double sensor FIG. 7 shows a variant of a measurement device for adjustment of the roll gap in a four-high stand where a measurement bracket 35 in the form of a C is used. The measurement bracket 35 consists for example of a ceramic material. At a spacing a from the upper measurement surface 18' formed by a turned face end of the upper supporting roll 22 and with at least one measurement ring 60 not shown (FIG. 4), is arranged a sensor 33 aligned to this measurement surface 18' and attached to one end of the measurement bracket 35. At a spacing b is mounted on the measurement bracket 35 a further sensor 33' aligned to the lower measurement surface 16'. The sensors—this is essential to the invention—lie in the area of rolling plane A.

The sensor surfaces 56 have a constant spacing c which is not relevant to the adjustment of the roll gap where deviations of the sum of spacings a and b from a specified value are determined. When working rolls 10, 12 lie against each other, which is the reference value for a and b, the sensors 33, 33' should not touch the measurement surfaces 16', 18'.

The measurement bracket 35 is positioned for example similarly to the measurement head in FIG. 2.

With the sensors 33, 33' aligned to the measurement areas 16', 18', the effect of the roll end formation is excluded.

In a first variant of FIG. 7, the sensors 33, 33' of a C-shaped measurement bracket 35 are aligned to measurement surfaces 16, 18 (FIG. 1) of working rolls 10, 12. In a second variant, double sensors 32 are arranged on a C-shaped measurement bracket 35 and are aligned to measurement surfaces 16, 18 of working rolls 10, 12 and measurement surfaces 16', 18' of supporting rolls 20, 22. A corresponding electronic arrangement allows the control of the roll gap using measurement surfaces 16, 18 and/or 16', 18'.

Figure 8:
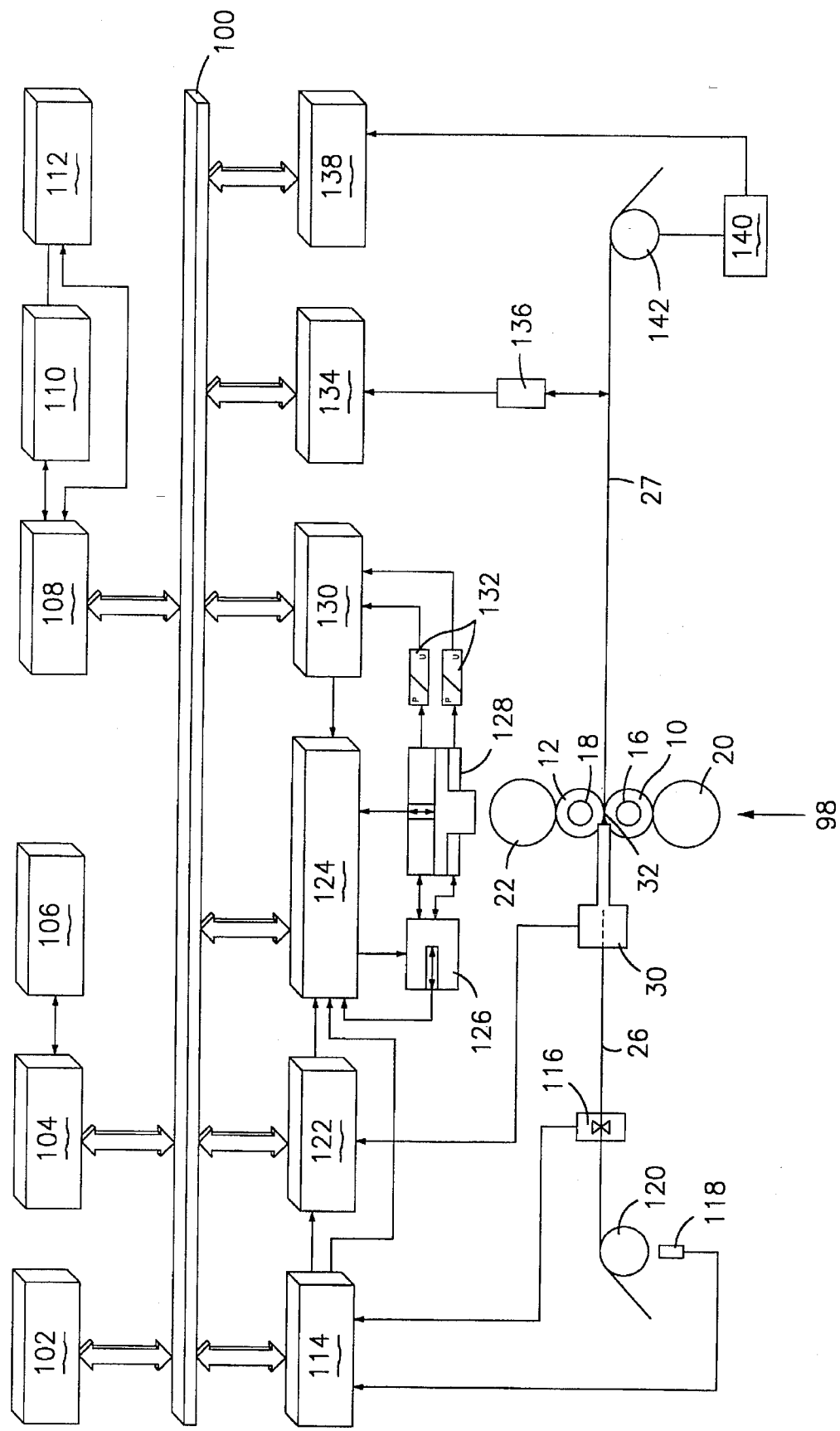

The block diagram shown in FIG. 8 gives an overview of a hydraulic roll gap adjustment system of a four-high cold rolling stand 98 in accordance with the invention.

A data path 100, shown by double arrows, is connected with the following function units which are present at least in part in the previous FIGS. 2, 5, 6 and 7:

microprocessor system 102
  interface 104 which connects on one side with a control and display panel 106
  coupler 108 which is connected on one side to a pump device 110 and the roll gear electronics 112 trend control 114 which is affected by a strip thickness measurement unit 116 of the incoming strip 26 and the strip speed sensor 118 on a deflector roller 120 of the incoming strip 26 roll gap control 122 which is affected by the measurement device in accordance with the invention with a double sensor 32 and which is influenced by the trend control 114 position control 124 which with the three-stage servo-valve 126 of the hydraulic pressure cylinder 128 forms a control circuit for the four-high cold rolling stand 98 and which is influenced by the trend control 114, the roll gap control 122, the hydraulic pressure cylinder 128 constant pressure control 130 which is affected by pressure sensors connected to the hydraulic pressure cylinder 128 and which in turn affects the position control 124 skinning pass control 134 which is connected with a laser sensor 136 working on the outgoing metal strip 27 strip thickness control 138 by adjustment of the front tension, which is affected by a tension measurement unit 140 for a deflector roller 142.

The double sensor 32 can also be arranged on the output side. With slight modifications to the control system, the rolls 10, 12, 20, 22 can also work in the reverse direction which changes the direction of feed of the strip.

We claim:

1. A rolling or continuous casting and rolling mill facility, comprising:
   a roll set comprising working rolls defining a roll gap therebetween and support rolls, at least one of the working rolls and the support rolls having coaxial reduced diameter barrel portions defining measurement surfaces thereon;
   measuring means for determining the roll gap by measuring a distance between the measurement surfaces, comprising a measurement head and a contact-free double sensor positioned on the measurement head;
   means for moving the measurement head between a working position wherein the double sensor is positioned in a rolling plane drawn through axes of rotation of the working rolls and aligned with the measurement surfaces and a rest position wherein the measurement head and double sensor are withdrawn from the rolling plane; and
   wherein the measurement head has substantially symmetrical chamfers for centering the measurement head relative to the measurement surfaces.

2. A facility in accordance with claim 1 wherein the reduced diameter barrel portions are fitted with at least one non-magnetic measurement ring which forms one of the measurement surfaces.

3. A facility in accordance with claim 2, wherein the at least one measurement ring is made from stainless steel.

4. A facility in accordance with claim 2, wherein the at least one measurement ring comprises a chemically deposited coating on at least one of the working rolls and supporting rolls.

5. A facility in accordance with claim 1, wherein the working rolls and support rolls have working barrel portions, and wherein the reduced diameter barrel portions are substantially adjacent to the working barrel portions.

6. A facility in accordance with claim 1, wherein the double sensor comprises sensors selected from the group consisting of ultrasound probes, eddy current probes, laser probes, capacitive probes and inductive probes.

7. A facility in accordance with claim 1, wherein the measurement head is vertically movably attached to an extension arm having a clamping cylinder for clamping the measurement head at a desired vertical position relative to the extension arm, whereby the measurement head is height adjustable.

8. A facility in accordance with claim 7, wherein the extension arm is mounted for swivel sideways in a plane substantially perpendicular to the rolling plane.

9. A facility in accordance with claim 1, wherein the measurement head has a longitudinal axis and wherein the chamfers comprise chamfer surfaces which slope rearwardly away from the longitudinal axis.

10. A rolling or continuous casting and rolling mill facility, comprising:
    a roll set comprising working rolls defining a roll gap therebetween and support rolls, at least one of the working rolls and the support rolls having coaxial reduced diameter barrel portions defining measurement surfaces thereon;
    measuring means for determining the roll gap by measuring a distance between the measurement surfaces, comprising a measurement bracket and at least one contact-free sensor mounted on the measurement bracket;
    means for moving the measurement bracket between a working position wherein the at least one sensor is positioned in a rolling plane drawn through axes of rotation of the working rolls and aligned with at least one of the measurement surfaces and a rest position wherein the measurement bracket and the at least one sensor are withdrawn from the rolling plane; and
    wherein the measurement bracket has substantially symmetrical chamfers for centering the measurement bracket relative to the measurement surfaces.

11. A facility in accordance with claim 10, wherein the working rolls and support rolls have working barrel portions, and wherein the reduced diameter barrel portions are substantially adjacent to the working barrel portions.

12. A facility in accordance with claim 10, wherein the at least one contact-free sensor comprises sensors selected from the group consisting of ultrasound probes, eddy current probes, laser probes, capacitive probes and inductive probes.

13. A facility in accordance with claim 10, wherein the measurement bracket is vertically movably attached to an extension arm having a clamping cylinder for clamping the measurement bracket at a desired vertical position relative to the extension arm, whereby the measurement bracket is height adjustable.

14. A facility in accordance with claim 13, wherein the extension arm is mounted for swivel sideways in a plane substantially perpendicular to the rolling plane.

15. A facility in accordance with claim 10, wherein the measurement bracket has a longitudinal axis and wherein the chamfers comprise chamfer surfaces which slope rearwardly away from the longitudinal axis.

16. A process for centering a measurement device relative to a roll gap of a rolling or continuous casting and rolling mill, comprising the steps of:
    providing the facility having a roll set comprising working rolls defining a roll gap therebetween and support rolls, at least one of the working rolls and the support rolls having coaxial reduced diameter barrel portions defining measurement surfaces thereon; measuring means for determining the roll gap by measuring a distance between the measurement surfaces, comprising a measurement head and a contact-free double sensor positioned on the measurement head; and means for moving the measurement head between a working position wherein the double sensor is positioned in a rolling plane drawn through axes of rotation of the reduced diameter barrel portions and aligned with the measurement surfaces and a rest position wherein the measurement head and double sensor are withdrawn from the rolling plane, wherein the measurement head has substantially symmetrical chamfers;

moving the measurement head from the rest position into the roll gap until the chamfers contact the measurement surfaces;

applying pressure to the measurement head against the measurement surfaces so that the chamfers urge the measurement head to a centered position relative to the measurement surfaces;

fixing the measurement head in the centered position; and returning the measurement head toward the rest position.

17. A process according to claim 16, further comprising the steps of moving the working rolls together to a roll gap of about 0 mm and rotating the working rolls at a peripheral speed of between about 5 to about 30 m/min at a setting force of between about 10 to 50% of a maximum permitted rolling force during the step of applying pressure.

* * * * *